US011366129B2

(12) United States Patent
Asakura et al.

(10) Patent No.: US 11,366,129 B2
(45) Date of Patent: Jun. 21, 2022

(54) AUTOMATIC ANALYZER AND AUTOMATIC ANALYSIS METHOD

(71) Applicant: JEOL Ltd., Tokyo (JP)

(72) Inventors: Makoto Asakura, Tokyo (JP); Chikashi Nakai, Tokyo (JP)

(73) Assignee: JEOL Ltd., Tokyo (JP)

( * ) Notice: Subject to any disclaimer, the term of this patent is extended or adjusted under 35 U.S.C. 154(b) by 369 days.

(21) Appl. No.: 16/410,195

(22) Filed: May 13, 2019

(65) Prior Publication Data
US 2019/0353675 A1    Nov. 21, 2019

(30) Foreign Application Priority Data

May 16, 2018  (JP) .............................. JP2018-094490

(51) Int. Cl.
*G01N 35/02*    (2006.01)
*G01N 35/10*    (2006.01)
*G01N 35/04*    (2006.01)

(52) U.S. Cl.
CPC ....... *G01N 35/025* (2013.01); *G01N 35/1002* (2013.01); *G01N 35/1004* (2013.01);
(Continued)

(58) Field of Classification Search
CPC ............ G01N 35/025; G01N 35/1002; G01N 35/1004; G01N 35/1009; G01N 35/1065;
(Continued)

(56) References Cited

U.S. PATENT DOCUMENTS

2001/0028863 A1 * 10/2001 Kitagawa ............... G01N 35/00
                                                            422/509
2004/0034479 A1 *  2/2004 Shimase ............ G01N 35/1016
                                                            702/19
(Continued)

FOREIGN PATENT DOCUMENTS

JP     2007240328 A    9/2007
JP     2009174911 A    8/2009
(Continued)

OTHER PUBLICATIONS

Office Action issued in JP2018-094490 dated Nov. 10, 2020.
Extended European Search Report issued in EP19173915.0 dated Oct. 16, 2019.

*Primary Examiner* — Jill A Warden
*Assistant Examiner* — John McGuirk
(74) *Attorney, Agent, or Firm* — The Webb Law Firm (57) ABSTRACT

An automatic analyzer includes a plurality of storage container holding units, a dispensing container holding unit, a plurality of dispensing devices, a dispensing abnormality detector, and a drive control unit. The plurality of dispensing devices each include a dispensing probe. The dispensing abnormality detector is provided in each dispensing device. The drive control unit is configured to control driving of each dispensing device based on a detection result of the dispensing abnormality detector. If a dispensing device in which an abnormality is detected is a first dispensing device, the drive control unit is configured to cause a dispensing process of a cycle in which the abnormality is detected to be performed again. If the dispensing device in which the abnormality is detected is not the first dispensing device, the drive control unit is configured to end the dispensing process of the cycle and start the next cycle.

5 Claims, 4 Drawing Sheets

(52) U.S. Cl.
CPC ..... *G01N 35/1009* (2013.01); *G01N 35/1065* (2013.01); *G01N 2035/0441* (2013.01); *G01N 2035/0443* (2013.01); *G01N 2035/0453* (2013.01); *G01N 2035/1018* (2013.01); *G01N 2035/1025* (2013.01)

(58) Field of Classification Search
CPC ... G01N 2035/0441; G01N 2035/0443; G01N 2035/0453; G01N 2035/1025; G01N 35/0092; G01N 2035/1018; G01N 2035/1016
See application file for complete search history.

(56) References Cited

U.S. PATENT DOCUMENTS

| | | |
|---|---|---|
| 2013/0121880 A1 | 5/2013 | Yamazaki |
| 2014/0190253 A1* | 7/2014 | Nishida ................ G01F 23/263 73/304 C |
| 2018/0031589 A1 | 2/2018 | Tamezane et al. |

FOREIGN PATENT DOCUMENTS

| | | | |
|---|---|---|---|
| JP | 2015172488 A | * | 10/2015 |
| JP | WO2016136438 A1 | | 9/2016 |

\* cited by examiner

AUTOMATIC ANALYZER AND AUTOMATIC ANALYSIS METHOD

CROSS-REFERENCE TO RELATED APPLICATION

This application claims priority to Japanese Patent Application No. 2018-094490 filed May 16, 2018, the disclosure of which is hereby incorporated by reference in its entirety.

BACKGROUND OF THE INVENTION

Field of the Invention

The present invention relates to an automatic analyzer and an automatic analysis method.

Description of Related Art

An automatic analyzer that analyzes biological components contained in a sample such as blood or urine includes a dispensing probe such as a sample probe for dispensing the sample into a reaction container or a reagent probe for dispensing a reagent, and a cleaning function to clean these dispensing probes. As a technique related to such an automatic analyzer, there is disclosed a technique that stops dispensing operation in a case where it is determined that clogging is caused by a sample probe and meanwhile, analyzes another sample without stopping the dispensing operation by cleaning the sample probe and then dispensing another sample (see JP 2007-240328 A) in a case while it is determined that the sample probe is clogged due to a liquid sample (sample). In addition, there is disclosed a technique that performs pressure monitoring in a reagent probe and again sucks the reagent in a case it is determined that the reagent is an abnormal reagent that has been subjected to abnormal sucking (see JP 2009-174911 A).

However, in the above-described automatic analyzer, in a case an abnormality has occurred in a dispensing process, operation control is not performed in accordance with the characteristics of the dispensing probe, and for example, a plurality of probes for dispensing the reagent, different operation control is not performed in accordance with order of dispensing to the reaction container. For this reason, although the dispensing process in which the abnormality has occurred is discontinued and the skip operation of performing a dispensing process of another dispensing liquid (sample or reagent) is required, in some cases, the retry operation of continuously performing the dispensing process to dispense the same dispensing liquid may be performed, or the skip operation may be performed in vain. In a case where the skip operation is performed, analysis relating to the skipped dispensing process needs to be additionally performed after a series of analysis processes has ended. For this reason, the useless skip operation is a factor that reduces the overall efficiency of the analysis processes.

SUMMARY OF THE INVENTION

Therefore, an object of the present invention is to provide an automatic analyzer and an automatic analysis method capable of improving the efficiency of an analysis process by performing dispensing operation in accordance with the characteristics of a dispensing probe.

An embodiment of the present invention for achieving such an object is an automatic analyzer that includes a plurality of storage container holding units, a dispensing container holding unit, a plurality of dispensing devices, a dispensing abnormality detector, and a drive control unit. The plurality of storage container holding units is configured to hold a storage container in which dispensing liquid is stored. The dispensing container holding unit is configured to hold a plurality of dispensing containers into which the dispensing liquid is to be dispensed. The plurality of dispensing devices includes a dispensing probe and is provided while corresponding to the storage container holding unit. The dispensing probe is configured to suck the dispensing liquid from the storage container and discharge the dispensing liquid into the dispensing container. The dispensing abnormality detector is provided in each dispensing device. The drive control unit is configured to control driving of each dispensing device on the basis of a detection result of the dispensing abnormality detector. If a dispensing device in which an abnormality is detected on the basis of the detection result of the dispensing abnormality detector among the plurality of dispensing devices is a first dispensing device configured to dispense the dispensing liquid first into the dispensing container, the drive control unit is configured to cause a dispensing process of a cycle in which the abnormality is detected to be performed again. If the dispensing device in which the abnormality is detected on the basis of the detection result of the dispensing abnormality detector is the dispensing device other than the first dispensing device, the drive control unit is configured to end the dispensing process of the cycle in which the abnormality is detected and then cause the dispensing process of a next cycle to be performed. An embodiment of the present invention is also an automatic analysis method performed by this automatic analyzer.

According to embodiments of the present invention, it is possible to provide an automatic analyzer and an automatic analysis method capable of improving the efficiency of an analysis process by the automatic analyzer by performing the dispensing operation in accordance with the characteristics of a dispensing probe.

DESCRIPTION OF THE INVENTION

Hereinafter, embodiments of an automatic analyzer and an automatic analysis method according to the present invention will be described in detail on the basis of the drawings.

<<Automatic Analyzer>>

Figure 1:
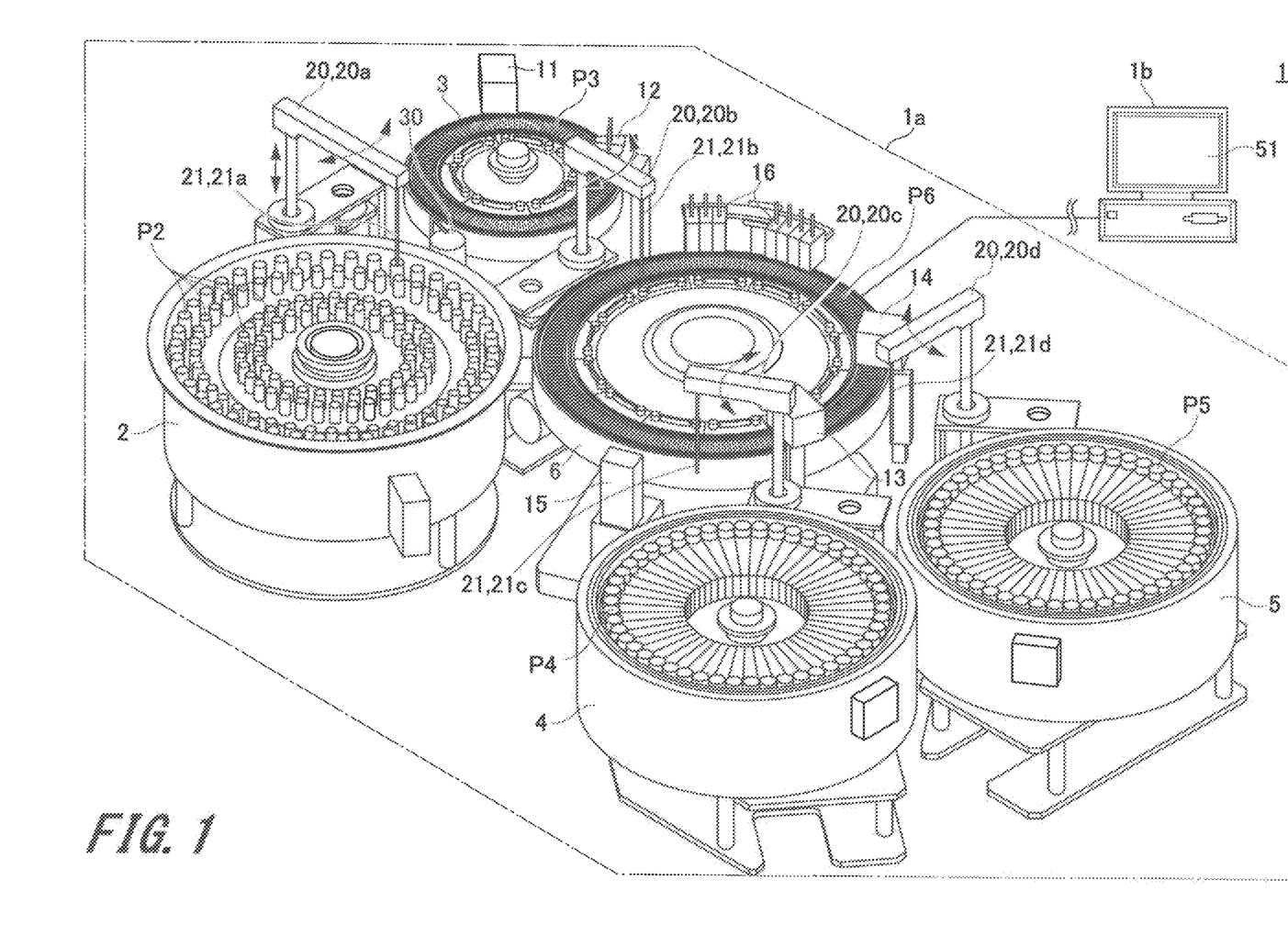
FIG. 1 is a schematic configuration view showing an automatic analyzer according to an embodiment.

FIG. 1 is a schematic configuration view showing the automatic analyzer according to the embodiment, FIG. 1 being a schematic configuration view showing, as an example, an automatic analyzer 1 in which the present invention is applied to a biochemical analyzer that analyzes biological components contained in a sample such as blood or urine. As shown in this figure, the automatic analyzer 1 is provided with a measurement unit 1a and a control unit 1b.

Among these units, the measurement unit 1a includes, for example, a sample holding unit 2, a diluted sample holding unit 3, a first reagent holding unit 4, a second reagent holding unit 5, and a reaction container holding unit 6. The measurement unit 1a further includes a dilution stirring device 11, a dilution cleaning device 12, a first reaction stirring device 13, a second reaction stirring device 14, a multi-wavelength photometer 15, and a reaction container cleaning device 16.

The measurement unit 1a further includes a plurality of dispensing devices 20 and a probe cleaning device 30. Here, for example, the dispensing devices 20 are four, that is, a sample dispensing device 20a, a diluted sample dispensing device 20b, a first reagent dispensing device 20c, and a second reagent dispensing device 20d. Each dispensing device 20 is provided with a dispensing probe 21.

Figure 2:
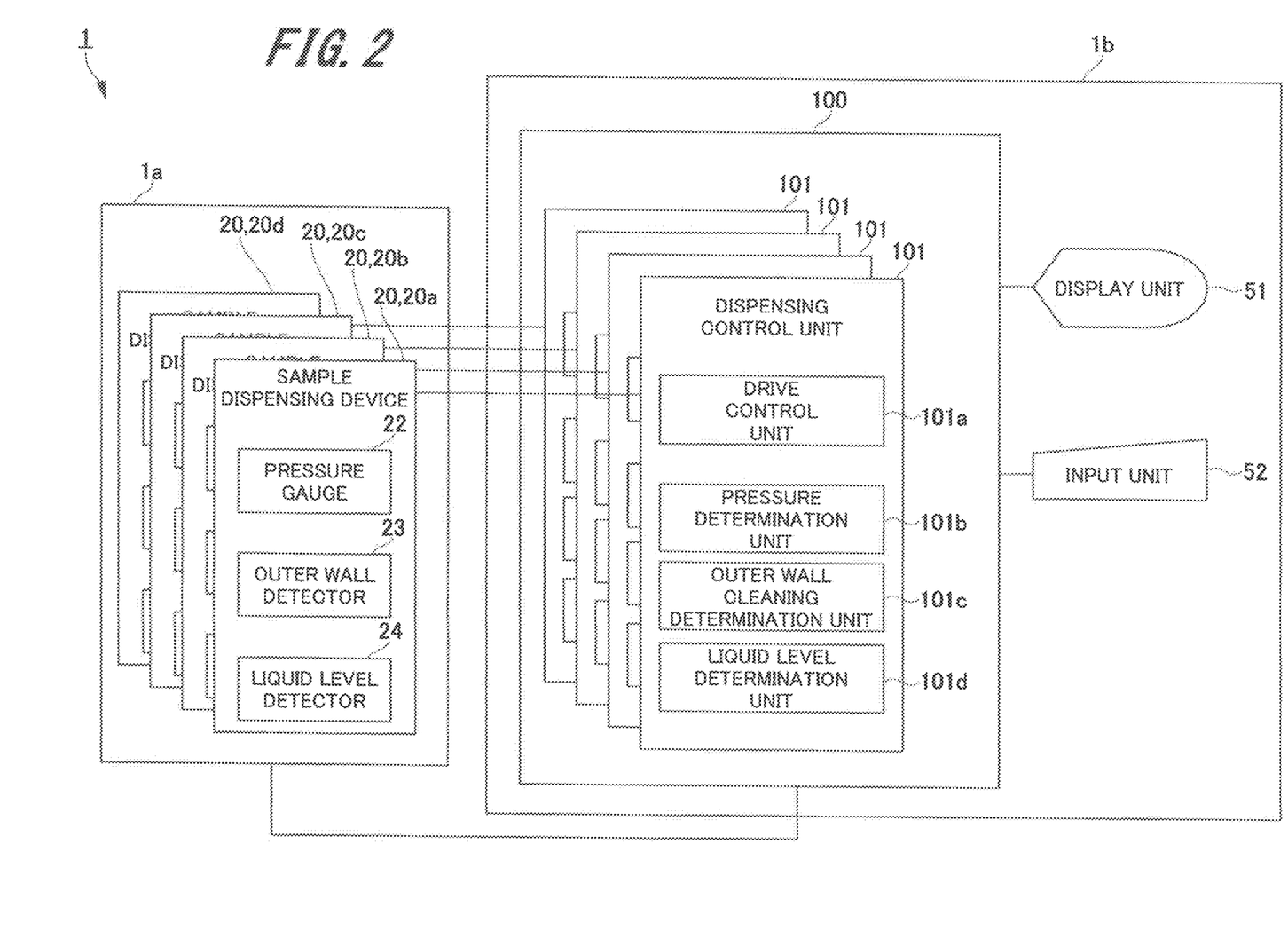
FIG. 2 is a block diagram of the automatic analyzer according to the embodiment.

FIG. 2 is a block diagram of the automatic analyzer 1 according to the embodiment. As shown in this figure, each dispensing device 20 is provided with a pressure gauge 22, an outer wall detector 23, and a liquid level detector 24 as dispensing abnormality detectors.

Meanwhile, the control unit 1b includes a display unit 51, and further includes an input unit 52 and a control unit 100. Hereinafter, on the basis of FIGS. 1 and 2, the details of these components will be described in order of the measurement unit 1a and the control unit 1b.

<Measurement Unit 1a> Sample Holding Unit 2

The sample holding unit 2 is one of storage container holding units that holds a plurality of storage containers in which dispensing liquid is stored. The sample holding unit 2 is, for example, of a turntable shape, and holds a plurality of sample containers P2 (i.e., storage containers) in a plurality of rows along the periphery of the sample holding unit 2 and convey the held sample containers P2 in both circumferential directions. The sample holding unit 2 is rotatably supported along the circumferential direction by a drive mechanism (not shown). Each sample container P2 held in the sample holding unit 2 is one in which a sample to be measured and a control sample for quality control are stored as dispensing liquid. The sample holding unit 2 is configured to hold these various samples at predetermined positions.

In addition to the sample container P2, the sample holding unit 2 may hold, as storage containers, a dilution liquid container in which dilution liquid is stored and a cleaning container in which cleaning liquid is stored. The sample holding unit 2 as described above may have a function of cooling the held sample container P2 and other containers.

[Diluted Sample Holding Unit 3]

The diluted sample holding unit 3 is one of dispensing container holding units that holds a dispensing container to which the dispensing liquid is to be dispensed and is also one of storage container holding units that hold the plurality of storage containers in which the dispensing liquid is stored. Such a diluted sample holding unit is, for example, of a turntable shape, holds a plurality of dilution containers P3 (i.e., dispensing container and storage container) along the periphery of the diluted sample holding unit, and is configured to convey the held dilution containers P3 in both circumferential directions. The diluted sample holding unit 3 is rotatably supported along the circumferential direction by a drive mechanism (not shown).

In the dilution container P3 held in the diluted sample holding unit 3, a sample sucked from the sample container P2 disposed in the sample holding unit 2 and diluted (hereinafter referred to as "diluted sample") is injected as a dispensing liquid. In addition, in each sample container P2, the diluted sample is stored as dispensing liquid. The automatic analyzer 1 may not include the diluted sample holding unit 3.

[First Reagent Holding Unit 4 and Second Reagent Holding Unit 5]

The first reagent holding unit 4 and the second reagent holding unit 5 are the storage container holding units that hold the plurality of storage containers in which the dispensing liquid is stored. The first reagent holding unit 4 is, for example, of a turntable shape, and holds a plurality of first reagent containers P4 (i.e., storage containers) along the periphery of the first reagent holding unit 4. In addition, the second reagent holding unit 5 is, for example, of a turntable shape, and holds a plurality of second reagent containers P5 (i.e., storage containers) along the periphery of the second reagent holding unit 5. Then, the first reagent holding unit 4 and the second reagent holding unit 5 are configured to respectively convey the held first reagent containers P4 and second reagent container P5 in both circumferential directions. The first reagent holding unit 4 and the second reagent holding unit 5 are rotatably supported along the circumferential direction by a drive mechanism (not shown).

Note that the number of reagent holding units provided in the automatic analyzer 1 is not limited to two, that is, the first reagent holding unit 4 and the second reagent holding unit 5 and may be one or three or more. In a case where the number of reagent holding units provided in the automatic analyzer 1 is one, there may be used a configuration in which the first reagent dispensing device 20c and the second reagent dispensing device 20d described later are provided while corresponding to one reagent holding unit.

Reaction Container Holding Unit 6

The reaction container holding unit 6 is one of the dispensing container holding unit that holds the dispensing container to which the dispensing liquid is to be dispensed. Such a reaction container holding unit 6 is disposed between the diluted sample holding unit 3, the first reagent holding unit 4, and the second reagent holding unit 5. The reaction container holding unit 6 is, for example, of a turntable shape, holds a plurality of reaction containers P6 (i.e., dispensing containers) along the periphery of the reaction container holding unit 6, and is configured to convey the held reaction containers P6 in both circumferential directions. The reaction container holding unit 6 is rotatably supported along the circumferential direction by a drive mechanism (not shown).

In the reaction containers P6 held by the reaction container holding unit 6, the diluted sample collected from the dilution container P3 of the diluted sample holding unit 3, a first reagent collected from the first reagent container P4 of the first reagent holding unit 4, and furthermore a second reagent collected from the second reagent container P5 of the second reagent holding unit 5 are dispensed each in a predetermined amount. Then, in the reaction container P6, the diluted sample, the first reagent, and the second reagent are stirred to cause a reaction among the diluted sample, the first reagent, and the second reagent, or the diluted sample and the first reagent are stirred to cause a reaction between the diluted sample and the first reagent.

The reaction container holding unit 6 as described above is configured to always keep the temperature of the reaction container P6 constant by a thermostat bath (not shown). Note that in a case where the automatic analyzer 1 does not include the diluted sample holding unit 3, the sample collected from the sample container P2 of the sample holding unit 2 is dispensed into the reaction container P6 held by the reaction container holding unit 6.

Dilution Stirring Device 11

The dilution stirring device 11 is disposed near the outer periphery of the diluted sample holding unit 3. The dilution stirring device 11 has a stirring mechanism and a drive mechanism for driving the stirring mechanism and is configured to insert a stirring bar (not shown) into the dilution container P3 held by the diluted sample holding unit 3 and stir the sample and the dilution liquid.

Dilution Cleaning Device 12

The dilution cleaning device 12 is disposed near the outer periphery of the diluted sample holding unit 3. The dilution cleaning device 12 is a device configured to clean the dilution container P3 after the diluted sample is sucked by the diluted sample dispensing device 20b described later.

First Reaction Stirring Device 13 and Second Reaction Stirring Device 14

The first reaction stirring device 13 and the second reaction stirring device 14 are disposed near the outer periphery of the reaction container holding unit 6. The first reaction stirring device 13 and the second reaction stirring device 14 are configured to stir the diluted sample and the first reagent or the second reagent in the reaction container P6 held by the reaction container holding unit 6. The first reaction stirring device 13 and the second reaction stirring device 14 each have a stirring mechanism and a drive mechanism for driving the stirring mechanism and are configured to insert a stirring bar (not shown) into the reaction container P6 held at a predetermined position of the reaction container holding unit 6 and stir the diluted sample (or sample) and the first reagent or the second reagent. Thus, a reaction between the diluted sample and the first reagent or a reaction between the diluted sample and the second reagent is advanced.

Multi-wavelength Photometer 15

The multi-wavelength photometer 15 is a measuring unit and is disposed to face the outer peripheral wall of the reaction container holding unit 6. The multi-wavelength photometer 15 is configured to perform optical measurement on the diluted sample that has reacted with the first reagent and the second reagent in the reaction container P6, outputs the amounts of various components in the sample as absorbance and detect a reaction state of diluted sample.

Reaction Container Cleaning Apparatus 16

The reaction container cleaning device 16 is disposed near the outer periphery of the reaction container holding unit 6. The reaction container cleaning device 16 is a device configured to clean the inside of the reaction container P6 for which an inspection has ended.

Sample Dispensing Device 20a

The sample dispensing device 20a is one of the dispensing devices 20 and includes a sample probe 21a as the dispensing probe 21 of a thin tube shape and is disposed near the outer periphery of the sample holding unit 2 and the diluted sample holding unit 3. The sample dispensing device 20a is configured to, according to a preset measurement program, insert a tip of the sample probe 21a whose axis direction is kept vertical into the sample in the sample container P2 hold by the sample holding unit 2 by a drive mechanism (not shown) and suck a predetermined amount of the sample into the sample probe 21a. At this time, the sample holding unit 2 is configured to, according to the preset measurement program, move the sample container P2 held at a predetermined position of the sample holding unit 2 to a predetermined sample collecting position.

In addition, the sample dispensing device 20a is configured to insert the tip of the sample probe 21a into the dilution container P3 of the diluted sample holding unit 3, and the sample sucked into the sample probe 21a and discharge a predetermined amount of the dilution liquid supplied from the sample dispensing device 20a itself into the dilution container P3. Thus, the sample is diluted to a concentration of a predetermined multiple in the dilution container P3. Furthermore, the sample dispensing device 20a is configured to clean the inner wall of the sample probe 21a.

The sample dispensing device 20a as described above is a first dispensing device that is configured to dispense the dispensing liquid (i.e., sample and dilution liquid) first into the dilution container P3 held in the diluted sample holding unit 3 described above.

In a case where the automatic analyzer 1 does not include the diluted sample holding unit 3, the sample dispensing device 20a is configured to insert the tip of the sample probe 21a into the reaction container P6 of the reaction container holding unit 6. Then, the sample sucked into the sample probe 21a is discharged into the reaction container P6.

Diluted Sample Dispensing Device 20b

The diluted sample dispensing device 20b is one of the dispensing devices 20, includes a diluted sample probe 21b as the dispensing probe 21 of a thin tube shape, and is disposed between the diluted sample holding unit 3 and the reaction container holding unit 6. The diluted sample dispensing device 20b is configured to, according to the preset measurement program, insert a tip of the diluted sample probe 21b whose axial direction is kept vertical into the dilution container P3 of the diluted sample holding unit 3 by a drive mechanism (not shown) and suck a predetermined amount of the diluted sample from the tip of the diluted sample probe 21b filled with system water. In addition, the diluted sample dispensing device 20b is configured to insert the tip of the diluted sample probe 21b into the reaction container P6 of the reaction container holding unit 6 and discharge the diluted sample sucked into the diluted sample probe 21b into the reaction container P6. Furthermore, the diluted sample dispensing device 20b is configured to clean the inner wall of the diluted sample probe 21b. Note that in a case where the automatic analyzer 1 does not include the diluted sample holding unit 3, the automatic analyzer 1 does not need to include the diluted sample dispensing device 20b.

[First Reagent Dispensing Device 20c]

The first reagent dispensing device 20c is one of the dispensing devices 20, includes a first reagent probe 21c as the dispensing probe 21 of a thin tube shape, and is disposed between the reaction container holding unit 6 and the first reagent holding unit 4. The first reagent dispensing device 20c is configured to, according to the preset measurement program, insert a tip of the first reagent probe 21c whose axial direction is kept vertical into the first reagent container P4 of the first reagent holding unit 4 by a drive mechanism (not shown) and suck a predetermined amount of the first reagent from the tip of the first reagent probe 21c filled with system water. In addition, the first reagent dispensing device 20c is configured to insert the tip of the first reagent probe 21c into the reaction container P6 of the reaction container holding unit 6 and discharge the first reagent sucked into the first reagent probe 21c into the reaction container P6. Furthermore, the first reagent dispensing device 20c is configured to clean the inner wall of the first reagent probe 21c.

In the present embodiment, the first reagent dispensing device 20c described above is a first dispensing device configured to dispense dispensing liquid (i.e., first reagent) first into the reaction container P6 (i.e., dispensing container) held by the reaction container holding unit 6 described above. However, in some cases, the first dispensing device for the reaction container P6 (i.e., dispensing container) may be the diluted sample dispensing device 20b or in a case where the automatic analyzer 1 does not include the diluted sample holding unit 3, the first dispensing device for the reaction container P6 may be the sample dispensing device 20a.

Second Reagent Dispensing Device 20d

The second reagent dispensing device 20d is one of the dispensing devices 20, includes a second reagent probe 21d as the dispensing probe 21 of a thin tube shape, and is disposed between the reaction container holding unit 6 and the second reagent holding unit 5. The second reagent dispensing device 20d is configured to, according to the preset measurement program, insert a tip of the second reagent probe 21d whose axial direction is kept vertical into the second reagent container P5 of the second reagent holding unit 5 by a drive mechanism (not shown) and suck a predetermined amount of the second reagent from the tip of the second reagent probe 21d filled with the system water. In addition, the second reagent dispensing device 20d is configured to insert the tip of the second reagent probe 21d into the reaction container P6 of the reaction container holding unit 6 and discharge the second reagent sucked into the second reagent probe 21d into the reaction container P6. Furthermore, the second reagent dispensing device 20d is configured to clean the inner wall of the second reagent probe 21d.

Pressure Gauge 22

The pressure gauge 22 is a measuring device for measuring an internal pressure of the dispensing probe 21 in each dispensing device 20 and is one of the dispensing abnormality detectors for detecting a dispensing abnormality by the dispensing device 20. A pressure detection method of such a pressure gauge 22 is not limited and may be a method suitable for measuring the internal pressure of the dispensing probe 21.

Outer Wall Detector 23

The outer wall detector 23 is a measuring device for detecting adhesion of foreign matter to an outer wall of the dispensing probe 21 in each dispensing device 20 and one of the dispensing abnormality detectors for detecting a dispensing abnormality by the dispensing device 20. Such an outer wall detector 23 is, for example, of a capacitance type, but is not limited to of the capacitance type and may be of another type.

Level Detector 24

The liquid level detector 24 is a measuring device for detecting a height position of a liquid level with respect to the tip of the dispensing probe 21 in each dispensing device 20 and is one of the dispensing abnormality detectors for detecting a dispensing abnormality by the dispensing device 20. Such a liquid level detector 24 is, for example, of a capacitance type, but is not limited to being of a capacitance type and may be of another type. In a case where the liquid level detector 24 is of the capacitance type, the liquid level detector 24 may double as the outer wall detector 23.

Probe Cleaning Device 30

The probe cleaning device 30 is for cleaning the tip of the dispensing probe 21 in each dispensing device 20 and is disposed on a track along which each dispensing probe 21 moves. In FIG. 1, as an example, a state in which the probe cleaning device 30 is provided on the track of the sample probe 21a between the sample holding unit 2 and the diluted sample holding unit 3 is illustrated.

The probe cleaning device 30 includes a cleaning tank and a cleaning liquid supply pipe for supplying cleaning liquid to the cleaning tank. The cleaning tank has a configuration in which one end of a tubular shape is squeezed into a narrow tube shape to form a drainage pipe and is installed with the drainage pipe directed downward. The probe cleaning device 30 is configured to, according to the preset measurement program, configured to supply the cleaning liquid from the cleaning liquid supply pipe by a drive mechanism (not shown), clean the outer wall of the dispensing probe 21 housed in the cleaning tank, and drain liquid in the cleaning tank from the drain pipe.

The probe cleaning device 30 as described above may be a probe cleaning device that uses a container held by the storage container holding unit or the dispensing container holding unit as a cleaning tank. In addition, the cleaning liquid in the cleaning tank also serves as the dispensing liquid dispensed by each dispensing device 20.

<Control Unit 1b>

The control unit 1b is connected to the drive mechanism of each component constituting the measurement unit 1a described above, the multi-wavelength photometer 15, the pressure gauge 22 of each dispensing device 20, the outer wall detector 23, and the liquid level detector 24. The control unit 1b includes the display unit 51, the input unit 52, and the control unit 100. The details of these components are as follows.

Display Unit 51

The display unit 51 is configured to display a measurement result of the multi-wavelength photometer 15 and also display various kinds of setting information and various kinds of history information in the automatic analyzer 1. For example, a liquid crystal display device or the like is used for the display unit 51. In addition, the display unit 51 also serves as an alarm output unit configured to output an alarm when a drive control unit 101a of the control unit 100 described later stops the dispensing device 20 in which an abnormality is detected. The alarm output unit is not limited to the display unit 51 and may be a speaker whose illustration is omitted here or may be both the display unit 51 and the speaker.

Input Unit 52

The input unit 52 is configured to receive inputs related to various settings performed by the operator of the automatic analyzer 1 and other inputs, and outputs an input signal to a control unit 100. As the input unit 52, for example, a mouse, a keyboard, a touch panel provided on a display surface of the display unit 51 or the like is used.

Control Unit 100

The control unit 100 is configured by a computer such as a microcomputer. The computer includes storage units such as a central processing unit (CPU), a read only memory (ROM) and a random access memory (RAM) and is configured to control the operation of each unit in the automatic analyzer 1. Such a control unit 100 includes a dispensing control unit 101 for in particular controlling the driving of the dispensing device 20.

The dispensing control unit 101 is provided, for example, while corresponding to each dispensing device 20. Each of such dispensing control units 101 includes a drive control unit 101a, a pressure determination unit 101b, an outer wall cleaning determination unit 101c, and a liquid level determination unit 101d as described later and is configured to control the driving of the sample probe 21a. In addition, it is not necessary that all dispensing control units 101 corresponding to the dispensing device 20 include all of the pressure determination unit 101b, the outer wall cleaning determination unit 101c, and the liquid level determination unit 101d. It is sufficient that each dispensing control unit 101 necessary for a normality determination to be performed in the dispensing control unit is provided. The determination is one of normality determinations on dispensing process operation performed in an automatic analysis method described later. In a case where the automatic analyzer 1 includes the dispensing device 20 that does not need to perform a normality determination, the corresponding dispensing control unit 101 does not need to be provided with the pressure determination unit 101b, the outer wall cleaning determination unit 101c, and the liquid level determination unit 101d.

Drive Control Unit 101a

The drive control unit 101a is configured to control the driving of the dispensing probe 21 in each dispensing device 20. The drive control of the dispensing probe 21 by the drive control unit 101a is performed on the basis of determination results at the outer wall cleaning determination unit 101c, the pressure determination unit 101b, and the liquid level determination unit 101d described later. The details of the drive control of the dispensing probe 21 performed by the drive control unit 101a will be described in detail in the following automatic analysis method.

Pressure Determination Unit 101b

The pressure determination unit 101b is configured to determine whether the internal pressure of each dispensing probe 21 of each dispensing device 20 is normal. Such a determination by the pressure determination unit 101b is performed on the basis of a measurement result of the pressure gauge 22 provided in each dispensing device 20. For example, the pressure determination unit 101b is configured to compare a value measured by the pressure gauge 22 with a preset allowable value and determine whether the internal pressure is normal on the basis of whether the value is within a range of an allowable value.

Outer Wall Cleaning Determination Unit 101c

The outer wall cleaning determination unit 101c is configured to determine whether the outer wall of each dispensing probe 21 of each dispensing device 20 is sufficiently cleaned in the probe cleaning device 30. Such a determination by the outer wall cleaning determination unit 101c is performed on the basis of a measurement result of the outer wall detector 23 provided in each dispensing device 20. For example, the outer wall cleaning determination unit 101c is configured to compare a value measured by the outer wall detector 23 with a preset allowable value and determine whether the cleaning of the outer wall is sufficient on the basis of whether the value is within a range of an allowable value.

Liquid Level Determination Unit 101d

The liquid level determination unit 101d determines whether a liquid level of liquid sucked by each dispensing probe 21 of each dispensing device 20 is at a normal position. Such a determination by the liquid level determination unit 101d is performed on the basis of a measurement result of the liquid level detector 24 provided in each dispensing device 20 and a height position of each sample probe 21a whose position is controlled by the drive control unit 101a. For example, the liquid level determination unit 101d is configured to determine whether the liquid level is normal on the basis of whether the height position of the sample probe 21a and the value measured by the liquid level detector 24 are within a range of a preset allowable value.

<<Automatic Analysis Method>>

Figure 3:
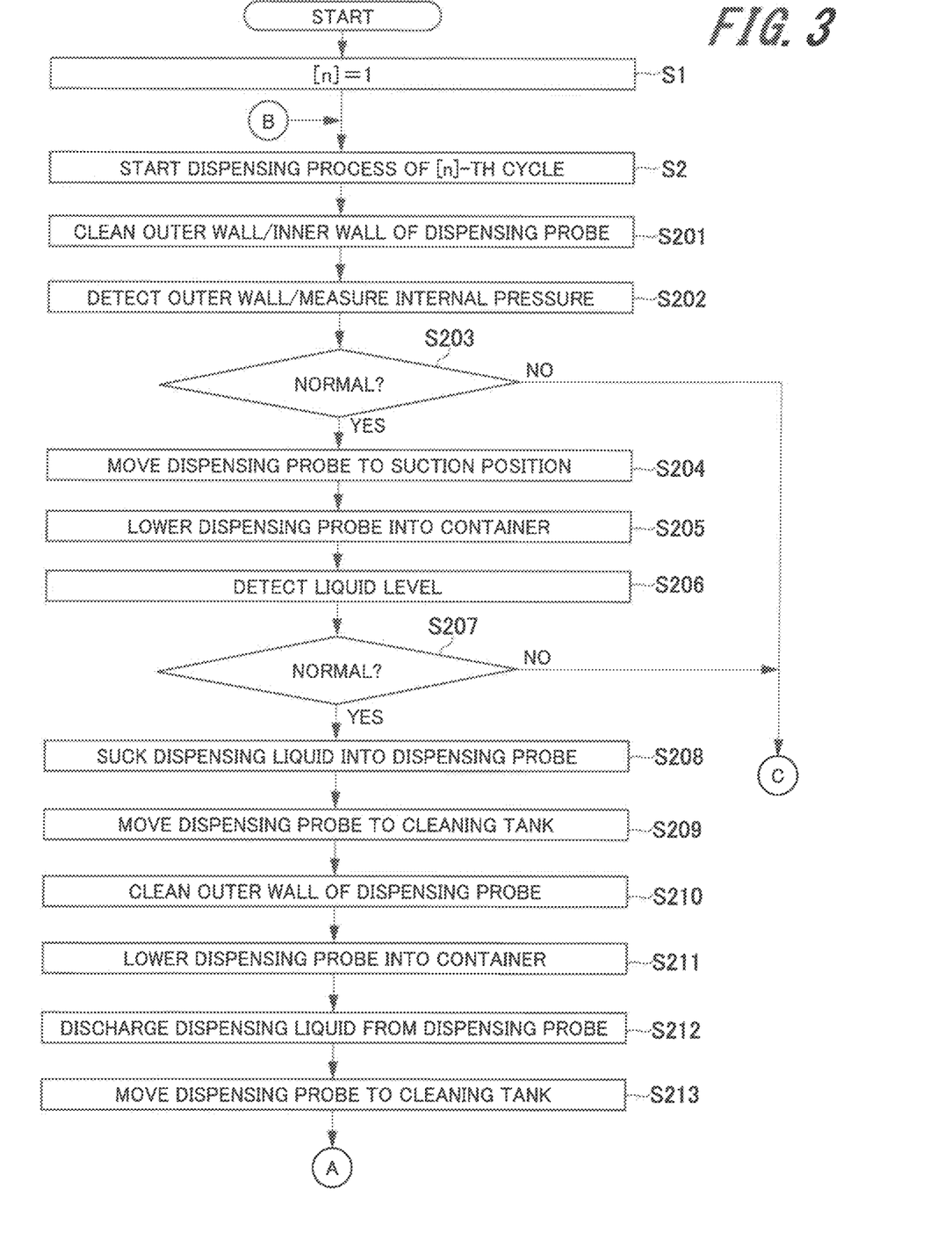
FIG. 3 is a flowchart (No. 1) showing an automatic analysis method using the automatic analyzer of the embodiment.
Figure 4:
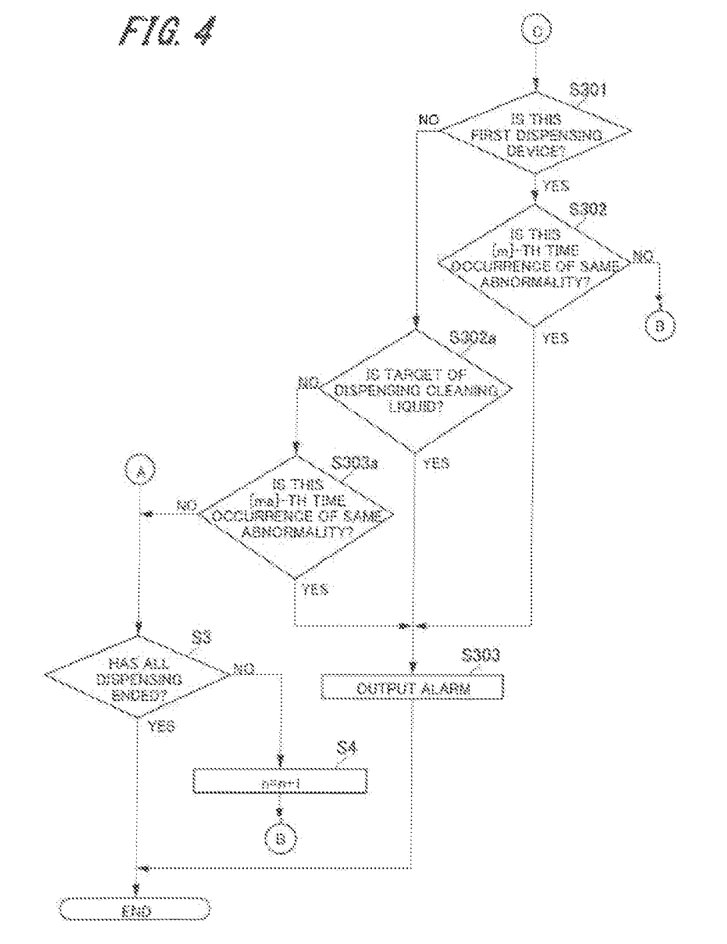
FIG. 4 is a flowchart (No. 2) showing the automatic analysis method using the automatic analyzer of the embodiment.

FIG. 3 is a flowchart (No. 1) showing an automatic analysis method using the automatic analyzer 1 of the embodiment. Moreover, FIG. 4 is a flowchart (the 2) which shows the automatic analysis method using the automatic analyzer 1 of the embodiment. The automatic analysis method described using these figures is a series of procedures in a case where the dispensing probe 21 of each dispensing device 20 is operated continuously in performing normal measurement operation by the automatic analyzer 1.

These procedures are achieved by the CPU constituting the control unit 100 described with reference to FIG. 2 executing a program stored in the storage unit, and, for example, is triggered by that the execution of the normal measurement operation is input from the input unit 52. Hereinafter, the automatic analysis method performed by the control unit 100 of the automatic analyzer 1 will be described with reference to FIGS. 1 and 2 in order shown in the flowcharts of FIGS. 3 and 4.

<Step S1>

First, in step S1, the drive control unit 101a of each dispensing control unit 101 performs a process of setting the number of cycles of dispensing [n] to [n]=1. The number of cycles of dispensing [n] is order of performing dispensing processes and the number of the dispensing processes. For example, even in a case where dispensing is performed a plurality of times for the same sample or reagent, the number of cycles [n] is assigned to each dispensing.

<Step S2>

Next, in step S2, each drive control unit 101a starts dispensing process of the [n]-th cycle. This process is performed as in the following steps S201 to S213.

<Step S201>

In step S201, the drive control unit 101a causes the outer wall and the inner wall of the dispensing probe 21 to be cleaned by driving each drive mechanism of the dispensing device 20 and the probe cleaning device 30. At this time, each dispensing device 20 moves the dispensing probe 21 to the cleaning tank of the probe cleaning device 30 and cleans the dispensing probe 21 in the cleaning tank. Note that as long as the cleaning tank is present on the track of the dispensing probe 21 of each dispensing device 20, the cleaning tank may be a container held by the storage container holding unit or the dispensing container holding unit adjacent to the dispensing device 20 and it is sufficient that the cleaning is performed in the cleaning tank set with respect to the dispensing device 20.

<Step S202>

Next, in step S202, the drive control unit 101a causes the pressure gauge 22 provided in the dispensing device 20 to measure pressure in the dispensing probe 21 after the cleaning has ended. In addition, the drive control unit 101a causes the outer wall detector 23 provided in the dispensing device 20 to measure capacitance of the dispensing probe 21 during the cleaning or after the cleaning has ended.

<Step S203>

Next, in step S203, the drive control unit 101a determines whether results of measurement in step S202 are normal on the basis of those results. Here, in a case where measurement is performed by the pressure gauge 22 in step S202, the pressure determination unit 101b determines whether the value measured by the pressure gauge 22 is within the range of the preset allowable value. In a case where measurement is performed by the outer wall detector 23 in step S202, the outer wall cleaning determination unit 101c determines whether the value measured by the outer wall detector 23 is within the range of the preset allowable value.

Then, in a case where both of the determination results are within the range of the allowable value, the drive control unit 101a determines that both of the results are normal (YES) and the process proceeds to step S204. Meanwhile, in a case where it is determined that at least one of the determination results is not within the allowable range, it is determined that the at least one of the determination results is not normal (NO) and the process proceeds to step S301.

<Step S204>

In step S204, the drive control unit 101a drives the drive mechanism of the dispensing device 20 to move the dispensing probe 21 to a suction position of the dispensing liquid.

<Step S205>

Next, in step S205, the drive control unit 101a drives the drive mechanism of the dispensing device 20 to lower the dispensing probe 21 into the storage container in which the dispensing liquid is stored.

<Step S206>

Thereafter, in step S206, the drive control unit 101a causes the liquid level detector 24 provided in the dispensing device 20 to measure the height position of the liquid level with respect to the tip of the dispensing probe 21.

<Step S207>

In step S207, the drive control unit 101a determines whether a result of measurement in step S206 is normal on the basis of the result. Here, in a case where measurement is performed by the liquid level detector 24 in step S206, the liquid level determination unit 101d determines whether a value measured by the liquid level detector 24 is within a range of a preset allowable value.

Then, in a case where a determination result is within the range of the allowable value, the drive control unit 101a determines that the determination result is normal (YES) and the process proceeds to step S208. Meanwhile, in a case where the determination result is not within the range of the allowable value, it is determined that the determination result is not normal (NO) and the process proceeds to step S301.

<Step S208>

In step S208, the drive control unit 101a drives the drive mechanism of the dispensing device 20 to suck the dispensing liquid into the dispensing probe 21.

<Step S209>

In step S209, the drive control unit 101a moves the dispensing probe 21 to the cleaning tank of the probe cleaning device 30 by driving the drive mechanism of the dispensing device 20. As long as the cleaning tank is present on the track of the dispensing probe 21 of each dispensing device 20, the cleaning tank may be a container held by the storage container holding unit or the dispensing container holding unit adjacent to the dispensing device 20.

<Step S210>

In step S210, the drive control unit 101a causes the outer wall of the dispensing probe 21 to be cleaned by driving each drive mechanism of the probe cleaning device 30.

<Step S211>

In step S211, the drive control unit 101a drives the drive mechanism of the dispensing device 20 to move the dispensing probe 21 onto the dispensing container into which the dispensing liquid is discharged and further lower the dispensing probe 21 into the dispensing container.

<Step S212>

In step S212, the drive control unit 101a drives the drive mechanism of the dispensing device 20 to discharge the dispensing liquid into the dispensing probe 21 into the dispensing container.

<Step S213>

In step S213, the drive control unit 101a moves the dispensing probe 21 to the cleaning tank of the probe cleaning device 30 by driving the drive mechanism of the dispensing device 20. As long as the cleaning tank is present on the track of the dispensing probe 21 of each dispensing device 20, the cleaning tank may be a container held by the storage container holding unit or the dispensing container holding unit adjacent to the dispensing device 20. By the above steps S201 to S213, the dispensing process of the [n]-th cycle is ended and then the process proceeds to step S3.

<Step S3>

In step S3, the drive control unit 101a determines whether all the dispensing processes by the dispensing device 20 have ended. For example, if the dispensing device 20 is the sample dispensing device 20a, it is determined whether all the dispensing processes have ended the set number of times for all the samples received by the automatic analyzer 1. In addition, if the dispensing device 20 is the diluted sample dispensing device 20b, the first reagent dispensing device 20c, and the second reagent dispensing device 20d, it is determined whether the dispensing processes corresponding to all the samples dispensed by the sample dispensing device 20a have ended.

Then, in a case where it is determined that all the dispensing processes have ended (YES), the drive of the corresponding dispensing device 20 has ended. Meanwhile, in a case where it is determined that all the dispensing processes has not ended (NO), the process proceeds to step S4.

<Step S4>

In step S4, the drive control unit 101a performs a process of [n]=n+1 for the number of cycles of dispensing [n]. Thereafter, the process returns to the previous step S2 and a dispensing process of the next [n (n=n+1)]-th cycle is started at predetermined timing.

<Step S301>

Meanwhile, at step S301 to which the process proceeds after it is determined that the determination result is not normal (NO) in step S203 or step S207 in the dispensing process of the [n]-th cycle described above, the drive control unit 101a determines whether this dispensing device 20 is a first dispensing device. Here, the first dispensing device is a device for dispensing the dispensing liquid for the first time into the dispensing container held in the dispensing container holding unit of the dispensing device 20. Here, the first dispensing device are the sample dispensing device 20a and the first reagent dispensing device 20c.

In a case where the dispensing device 20 is the sample dispensing device 20a or the first reagent dispensing device 20c, the drive control unit 101a determines that the dispensing device 20 is the first dispensing device (YES) and the process proceeds to step S302. Meanwhile, in a case where the dispensing device 20 is the diluted sample dispensing device 20b and the second reagent dispensing device 20d, the drive control unit 101a determines that the dispensing device 20 is not the first dispensing device (NO) and the process proceeds to step S302a.

<Step S302>

In step S302, the drive control unit 101a determines whether an abnormality determined to be not within the range of the allowable value for the same determination item is one that has occurred for the preset [m]-th time (for example, m=3). In a case where it is determined that the abnormality is one that has occurred for the [m]-th time (for example, m=3) (YES), the process proceeds to step S303.

Meanwhile, in a case where it is determined that the abnormality is not one that has occurred for the [m]-th time (for example, m=3) (NO), the process directly returns to step S2. Then, the dispensing process scheduled in the [n]-th cycle is started again at predetermined timing, and the dispensing of the [n]-th cycle is retried. That is, in a case where the dispensing device 20 in which the abnormality has occurred is the first dispensing device, one measurement operation is not affected, and the occurrence of the same abnormality has not reached the preset [m]-th time (for example, m=3), the dispensing of the [n] cycle is retried.

<Step S303>

On the other hand, in step S303 to which proceeds after it is determined that the abnormality is one that has occurred for the [m]-th time (for example, m=3) (YES), the drive control unit 101*a* causes the alarm output unit such as the display unit 51 to output an alarm on the occurrence of an abnormality. At this time, the alarm output unit also notifies the information of the item for which the determination result is determined to be not within the allowable range in step S203 or step S207. Thereafter, the driving of the dispensing device 20 which the abnormality has occurred is stopped and ended.

That is, even if the dispensing device 20 in which the abnormality has occurred is the first dispensing device, in a case where the occurrence of the same abnormality has reached the preset [m]-th time (for example, m=3), the alarm on the occurrence of an abnormality is output and the driving of the dispensing device 20 in which the abnormality has occurred is stopped. Thus, an operator of the automatic analyzer 1 can perform maintenance on the dispensing device 20 in which the abnormality has occurred.

<Step S302*a*>

In step S302*a* to which the process proceeds after it is determined that the dispensing device 20 in which the abnormality occurred is not the first dispensing device (NO), the drive control unit 101*a* determines whether the dispensing process of the [n]-th cycle in which the abnormality has occurred is a dispensing process for the cleaning liquid. Here, the dispensing control unit 101 corresponding to each dispensing device 20 is programmed, for example, to perform the dispensing process for the cleaning liquid between the cycles of dispensing processes of different types of dispensing liquid. This dispensing process is for preventing contamination due to carryover of dispensing liquids.

In step S302*a*, in a case where the dispensing device 20 in which the abnormality has occurred is not the first dispensing device, it is determined whether the dispensing process of the [n]-th cycle in which the abnormality occurred is the dispensing process for the cleaning liquid. Here, in a case where it is determined that this dispensing process, that is, the dispensing process of the [n]-th cycle, is the dispensing process for cleaning liquid (YES), the process proceeds to step S303. Then, the alarm output unit such as the display unit 51 is caused to output the alarm on the occurrence of an abnormality, and the driving of the dispensing device in which the abnormality has occurred is ended. That is, in the dispensing device 20 that is not the first dispensing device, in a case where an abnormality has occurred in the dispensing process for the cleaning liquid, the alarm is output and the driving of the dispensing device 20 is immediately stopped.

Meanwhile, in a case where it is determined in step S302*a* that the dispensing process is not for the cleaning liquid (NO), the process proceeds to step S303*a*.

<Step S303*a*>

In step S303*a*, the drive control unit 101*a* determines whether the abnormality determined to be not in the range of the allowable value for the same determination item is one that has occurred for the preset [ma]-th time (for example, ma=3). Here, in a case where it is determined that the abnormality is one that has occurred for the [ma]-th time (for example, ma=3) (YES), the process proceeds to step S303. Then, the alarm output unit such as the display unit 51 is caused to output the alarm on the occurrence of an abnormality, and the driving of the dispensing device in which the abnormality has occurred is ended.

Meanwhile, in step S303*a*, in a case where it is determined that the abnormality is one that has occurred for the [ma]-th time (for example, m=3) is not (NO), the process proceeds to step S3. In a case where it is determined in step S3 that all the dispensing processes have not ended, the process proceeds to step S4, the dispensing of the [n] cycle is skipped without being performed, and a process of [n]=n+1 is performed regarding the number of cycles of dispensing on [n]. Thereafter, the process returns to the previous step S2. Thus, the dispensing process of the [n (n=n+1)]-th cycle scheduled next is started at predetermined timing.

That is, in a case where the dispensing device 20 in which the abnormality has occurred is not the first dispensing device, if the dispensing process of the [n]-th cycle in which the abnormality occurred is not the dispensing process for the cleaning liquid and the occurrence of the same abnormality has not reached the preset [ma]-th time (for example, ma=3), the process skips to the dispensing of the next [n (n=n+1)] cycle is performed without the dispensing of the [n]-th cycle being performed.

<<Effects of Embodiment>>

According to the embodiment described above, in the first dispensing device that dispenses the dispensing liquid first into the dispensing container to which the dispensing liquid is to be dispensed, in a case where an abnormality has occurred in the dispensing of the [n] cycle, the dispensing of the scheduled [n]-th cycle is performed again. Then, in a case where an abnormality has occurred in the dispensing of the [n]-th cycle in a dispensing device other than the first dispensing device, the scheduled dispensing of the [n]-th cycle is skipped without being performed and the next dispensing of the [n (n+1)]-th cycle is performed.

As described above, by changing the flow of the dispensing process in accordance with the characteristics of the dispensing probe, it is possible to remove useless skip operation in the dispensing operation in the automatic analyzer 1 and the automatic analysis method in which a plurality of dispensing probes are operated in parallel. For this reason, it is possible to reduce the number of additional analysis processes performed after the end of the series of analysis operation required by skipping the dispensing process. As a result, it is possible to improve the efficiency of the analysis process by the automatic analyzer 1.

In addition, in the above-described embodiment, in a case where an abnormality has occurred in the dispensing process for the cleaning liquid in the dispensing device that is not the first dispensing device, the driving of the dispensing device is immediately stopped. Thus, in a case where an abnormality has occurred in the dispensing process of the cleaning liquid, the dispensing process can be skipped, and the next dispensing process can be prevented from being performed. For this reason, it is possible to prevent the dispensing process from being repeated without a series of cleaning processes including the scheduled dispensing process of the cleaning liquid being performed, and for example, it is possible to prevent contamination due to carryover of the dispensing liquid.

The invention claimed is:

1. An automatic analyzer comprising:
a plurality of storage container holding units configured to hold storage containers in which dispensing liquid is stored;
a dispensing container holding unit configured to hold a plurality of dispensing containers into which the dispensing liquid is dispensed;
a plurality of dispensing devices corresponding to a respective storage container holding unit, each dispensing device of the plurality of dispensing devices comprising a dispensing probe and each dispensing probe being configured to suck the dispensing liquid from a respective storage container and discharge the dispensing liquid into a respective dispensing container, wherein the plurality of dispensing devices comprises at least a first dispensing device, and wherein the first dispensing device is configured to dispense the dispensing liquid first into the dispensing container;
a dispensing abnormality detector provided in each dispensing device of the plurality of dispensing devices; and
a drive control unit configured to control the driving of each dispensing device of the plurality of dispensing devices based on a detection result of a respective dispensing abnormality detector, wherein the drive control unit is configured to cause the first dispensing device to dispense the dispensing liquid first into the dispensing container,
wherein in a case where a dispensing device in which an abnormality is detected based on a detection result of the dispensing abnormality detector among the plurality of dispensing devices, the drive control unit is configured to determine whether the dispensing device in which the abnormality is detected is the first dispensing device of the plurality of dispensing devices, wherein if the drive control unit determines that the dispensing device in which the abnormality is detected is the first dispensing device of the plurality of dispensing devices, the drive control unit is configured to cause a dispensing process of a [n]th cycle of dispensing of [n] cycles of dispensing in which the abnormality is detected to be retried, and in a case where the dispensing device in which the abnormality is detected is a dispensing device other than the first dispensing device of the plurality of dispensing devices, the drive control unit is configured to end the dispensing process of the [n]th cycle of dispensing in which the abnormality is detected and cause the dispensing process of a [n (n=n+1)]th cycle of dispensing to be performed, wherein [n] is a number of cycles of dispensing, an order of performing each dispensing process, and a number of dispensing processes, and wherein [n (n=n+1)]th is a next scheduled cycle of the number of cycles of dispensing [n]; and
wherein the dispensing process of a [n]th cycle of dispensing comprises:
cleaning an outer wall and an inner wall of the dispensing probe in a respective cleaning tank of a probe cleaning device;
measuring a pressure in the dispensing probe with a pressure gauge provided in a dispensing device of the plurality of dispensing devices;
determining whether a value of the pressure measured by the pressure gauge is within a first preset range of values, wherein if the value of the pressure is outside the first preset range of values an abnormality is detected;
based on determining that the value of the pressure is within the first preset range of values, moving the dispensing probe to a suction position of the dispensing liquid;
lowering the dispensing probe into the respective storage container;
measuring a height position of a liquid level with respect to a tip of the dispensing probe;
determining whether a value of the height position measured is within a second preset range of values, wherein if the value of the height position is outside the second preset range of values an abnormality is detected;
based on determining that the value of the height position is within the second preset range of values, sucking the dispensing liquid into the dispensing probe;
moving the dispensing probe onto a dispensing container into which the dispensing liquid is discharged and lowering the dispensing probe into the dispensing container;
discharging the dispensing liquid into the dispensing container; and
returning the dispensing probe to the cleaning tank.

2. The automatic analyzer according to claim 1,
wherein the storage container holding unit is:
a sample holding unit configured to hold a sample container in which a sample is stored as the dispensing liquid;
at least one reagent holding unit configured to hold a reagent container in which reagent is stored as the dispensing liquid; and
a diluted sample holding unit configured to hold a first dilution container in which a diluted sample is stored as the dispensing liquid,
the dispensing container holding unit is:
the diluted sample holding unit configured to hold a second dilution container into which the sample in the sample container is dispensed as the dispensing liquid; and
a reaction container holding unit configured to hold a reaction container into which the diluted sample in the dilution container and the reagent in the reagent container are dispensed as the dispensing liquid, and
the first dispensing device is:
a dispensing device configured to be the first dispensing device of any of the plurality of dispensing devices configured to dispense the sample into the diluted sample holding unit from the sample holding unit or one of the dispensing devices of the plurality of dispensing devices corresponding to the at least one reagent holding unit.

3. The automatic analyzer according to claim 1,
wherein the drive control unit is configured to cause the plurality of dispensing devices to perform a dispensing process of cleaning liquid between the [n]th cycle of the dispensing process of the dispensing liquid and the [n (n=n+)1]th cycle of the dispensing process, and
in a case where the dispensing device in which the abnormality is detected is the dispensing device other than the first dispensing device and the dispensing process of the [n]th cycle of dispensing in which the abnormality is detected is the dispensing process of the cleaning liquid, the drive control unit is configured to stop dispensing operation of the dispensing device in which the abnormality is detected.

4. The automatic analyzer according to claim 1,
wherein the drive control unit is configured to stop the dispensing operation of a dispensing device in which the same abnormality is detected a predetermined number of times among the plurality of dispensing devices at the dispensing abnormality detector.

5. The automatic analyzer according to claim 3,
further comprising an alarm output unit configured to output an alarm when the dispensing operation of the dispensing device in which the abnormality is detected is stopped.

* * * * *

UNITED STATES PATENT AND TRADEMARK OFFICE
CERTIFICATE OF CORRECTION

PATENT NO. : 11,366,129 B2
APPLICATION NO. : 16/410195
DATED : June 21, 2022
INVENTOR(S) : Makoto Asakura et al.

Page 1 of 1

It is certified that error appears in the above-identified patent and that said Letters Patent is hereby corrected as shown below:

In the Claims

Column 16, Line 59, Claim 3, delete "[n (n=n+)1]th" and insert -- [n (n=n+1)]th --

Signed and Sealed this
Nineteenth Day of December, 2023

Katherine Kelly Vidal
*Director of the United States Patent and Trademark Office*